(12) United States Patent
Kim et al.

(10) Patent No.: US 12,314,450 B2
(45) Date of Patent: May 27, 2025

(54) METHOD AND DEVICE FOR NFT-BASED SOFTWARE

(71) Applicant: SAMSUNG ELECTRONICS CO., LTD., Suwon-si (KR)

(72) Inventors: Bumhan Kim, Suwon-si (KR); Eunbi Kim, Suwon-si (KR); Sangbin Baek, Suwon-si (KR); Hansang Song, Suwon-si (KR); Seungwon Shin, Suwon-si (KR); Daeun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 17/882,980

(22) Filed: Aug. 8, 2022

(65) Prior Publication Data

US 2023/0056827 A1 Feb. 23, 2023

Related U.S. Application Data

(63) Continuation of application No. PCT/KR2022/008298, filed on Jun. 13, 2022.

(30) Foreign Application Priority Data

Aug. 19, 2021 (KR) .................. 10-2021-0109452

(51) Int. Cl.
*G06F 21/64* (2013.01)
*G06F 21/10* (2013.01)
*H04L 9/00* (2022.01)

(52) U.S. Cl.
CPC ............. *G06F 21/64* (2013.01); *G06F 21/10* (2013.01); *H04L 9/50* (2022.05)

(58) Field of Classification Search
CPC ........ G06F 21/64; G06F 21/10; G06F 21/121; H04L 9/50; H04L 2209/56
See application file for complete search history.

(56) References Cited

U.S. PATENT DOCUMENTS 10,789,339 B1 9/2020 Li
11,568,394 B1 * 1/2023 Song .................. G06Q 20/4016
(Continued)

FOREIGN PATENT DOCUMENTS

JP 6640320 7/2020
KR 10-2018-0114198 10/2018
(Continued)

OTHER PUBLICATIONS

Search Report dated Sep. 19, 2022 issued in International Patent Application No. PCT/KR2022/008298.

*Primary Examiner* — Ramy M Osman
(74) *Attorney, Agent, or Firm* — NIXON & VANDERHYE P.C.

(57) ABSTRACT

A method and device for non-fungible token (NFT)-based software is disclosed. A method of running the NFT-based software performed on the device includes: running the NFT-based software in response to an execution request for executing the NFT-based software; loading NFT metadata including identification information indicating the NFT-based software, identification information indicating an owner of the NFT-based software, and specified engraving data, in response to the execution request; and outputting the engraving data included in the NFT metadata based on an event occurring as the NFT-based software runs.

17 Claims, 9 Drawing Sheets

(56) References Cited

U.S. PATENT DOCUMENTS

| | | | |
|---|---|---|---|
| 2018/0176318 A1 | 6/2018 | Rathod | |
| 2020/0005284 A1* | 1/2020 | Vijayan | |
| 2020/0213121 A1* | 7/2020 | Hioki | H04L 9/3239 |
| 2021/0089713 A1* | 3/2021 | Jaskot | G06F 16/258 |
| 2021/0248214 A1 | 8/2021 | Goldston et al. | |
| 2022/0067681 A1* | 3/2022 | Choi | G06Q 20/3821 |
| 2022/0318233 A1* | 10/2022 | Martinez | H04L 9/50 |
| 2022/0329446 A1* | 10/2022 | Jackson | H04L 9/3247 |
| 2023/0056827 A1* | 2/2023 | Kim | G06F 21/64 |
| 2023/0122552 A1* | 4/2023 | Meyers | H04L 9/3247 463/29 |
| 2023/0222187 A1* | 7/2023 | Goldston | G06F 16/48 726/28 |
| 2023/0247053 A1* | 8/2023 | Sharma | H04L 63/102 726/7 |
| 2023/0409679 A1* | 12/2023 | Rubin | H04L 9/3073 |
| 2023/0421399 A1* | 12/2023 | Quirk | H04L 9/3239 |
| 2024/0013200 A1* | 1/2024 | Singh | H04L 9/50 |
| 2024/0037643 A1* | 2/2024 | Lee | G06Q 30/0645 |
| 2024/0194030 A1* | 6/2024 | Choi | G07F 17/3276 |
| 2024/0212456 A1* | 6/2024 | Choi | G07F 17/3276 |
| 2024/0249289 A1* | 7/2024 | Chiapuzio | H04L 9/008 |
| 2024/0257114 A1* | 8/2024 | Sugawara | G06Q 30/0641 |
| 2024/0303697 A1* | 9/2024 | Okamoto | G06Q 30/018 |
| 2024/0370865 A1* | 11/2024 | Bernardi | G06Q 20/36 |

FOREIGN PATENT DOCUMENTS

| | | |
|---|---|---|
| KR | 10-2011363 | 8/2019 |
| KR | 10-2020-0104590 | 9/2020 |
| KR | 10-2021-0096540 | 8/2021 |

\* cited by examiner

METHOD AND DEVICE FOR NFT-BASED SOFTWARE

CROSS-REFERENCE TO RELATED APPLICATIONS

This application is a continuation of International Application No. PCT/KR2022/008298 designating the United States, filed on Jun. 13, 2022, in the Korean Intellectual Property Receiving Office and claiming priority to Korean Patent Application No. 10-2021-0109452 filed on Aug. 19, 2021, in the Korean Intellectual Property Office, the disclosures of which are incorporated by reference herein in their entireties.

BACKGROUND

1. Field

The disclosure relates to a method and device for non-fungible token (NFT)-based software, and for example, to a method and device for generating and running NFT-based software.

2. Description of Related Art

A non-fungible token (NFT), a unit of data stored in a blockchain, refers to a token that is unique and not interchangeable. Storing ownership of a digital file in a blockchain in the form of an NFT may disable forgery, and alteration and may retain the uncopiable or unclonable uniqueness of the digital file and enable recording of the ownership in a decentralized form. The characteristics of the NFT may be based on non-exchangeability, which is different from other existing cryptocurrencies. While an existing cryptocurrency is exchanged one-to-one (1:1) with another cryptocurrency, the NFT may be non-tradable and not establish such a one-to-one (1:1) trade. Thus, each NFT may remain scarce and prove an irreversible trade. The NFT may enable the tokenization of almost everything and may thus be used in trades in games, music, art, and virtual space.

SUMMARY

Embodiments of the disclosure provide a technology for the generation, sales, and execution of software to which a non-fungible token (NFT) is issued.

Embodiments of the disclosure provide a digital engraving service for adding engraving data to NFT-based software and displaying the software and/or ownership thereof on an execution screen displayed as the software is run.

According to an example embodiment, there is provided method of running NFT-based software performed on a device, the method including: receiving an execution request for executing the NFT-based software; loading NFT metadata corresponding to the NFT-based software in response to the execution request; verifying a right for execution of the NFT-based software based on at least one of device-related information or owner-related information included in the NFT metadata; running the NFT-based software based on a result of the verifying; and outputting engraving data corresponding to the NFT-based software on an execution screen displayed as the NFT-based software runs.

According to an example embodiment, there is provided a method of running NFT-based software performed on a device, the method including: running the NFT-based software in response to an execution request for executing the NFT-based software; loading NFT metadata including identification information indicating the NFT-based software, identification information indicating an owner of the NFT-based software, and specified engraving data, in response to the execution request; and outputting the engraving data included in the NFT metadata based on an event occurring as the NFT-based software runs.

According to an example embodiment, there is provided a method of generating NFT-based software performed on a device linked with a server for trading the NFT-based software, the method including: defining engraving data output based on the NFT-based software running; transmitting, to the server, the defined engraving data and a file to be generated as the NFT-based software; receiving, from the server, encoded data corresponding to the file generated based on the engraving data and the NFT metadata corresponding to the NFT-based software; generating packaged NFT-based software by adding, to the encoded data, a digital signature for verifying the NFT-based software; and transmitting the packaged NFT-based software to the server.

According to an example embodiment, there is provided a device including: a memory storing therein NFT-based software; and at least one processor configured to: receive an execution request for executing the NFT-based software, load NFT metadata corresponding to the NFT-based software in response to the execution request; verify a right for execution of the NFT-based software based on at least one of device-related information or owner-related information included in the NFT metadata, run the NFT-based software based on a result of the verifying, and output engraving data corresponding to the NFT-based software on an execution screen displayed as the NFT-based software runs.

According to an example embodiment, there is provided a device including: a memory storing therein NFT-based software; and at least one processor configured to: run the NFT-based software in response to an execution request for executing the NFT-based software, load NFT metadata including identification information indicating the NFT-based software, identification information indicating an owner of the NFT-based software, and specified engraving data in response to the execution request, and output the engraving data included in the NFT metadata based on an event occurring as the NFT-based software runs.

According to an example embodiment, there is provided a device including: a communication module comprising communication circuitry configured to communicate with a server for trading NFT-based software; and at least one processor configured to: define engraving data to be output based on the NFT-based software running, control the device to transmit, to the server, the defined engraving data and a file to be generated as the NFT-based software, receive, from the server, encoded data corresponding to the file generated based on the engraving data and the NFT metadata corresponding to the NFT-based software, generate packaged NFT-based software by adding, to the encoded data, a digital signature for verifying the NFT-based software, and control the device to transmit the packaged NFT-based software to the server.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
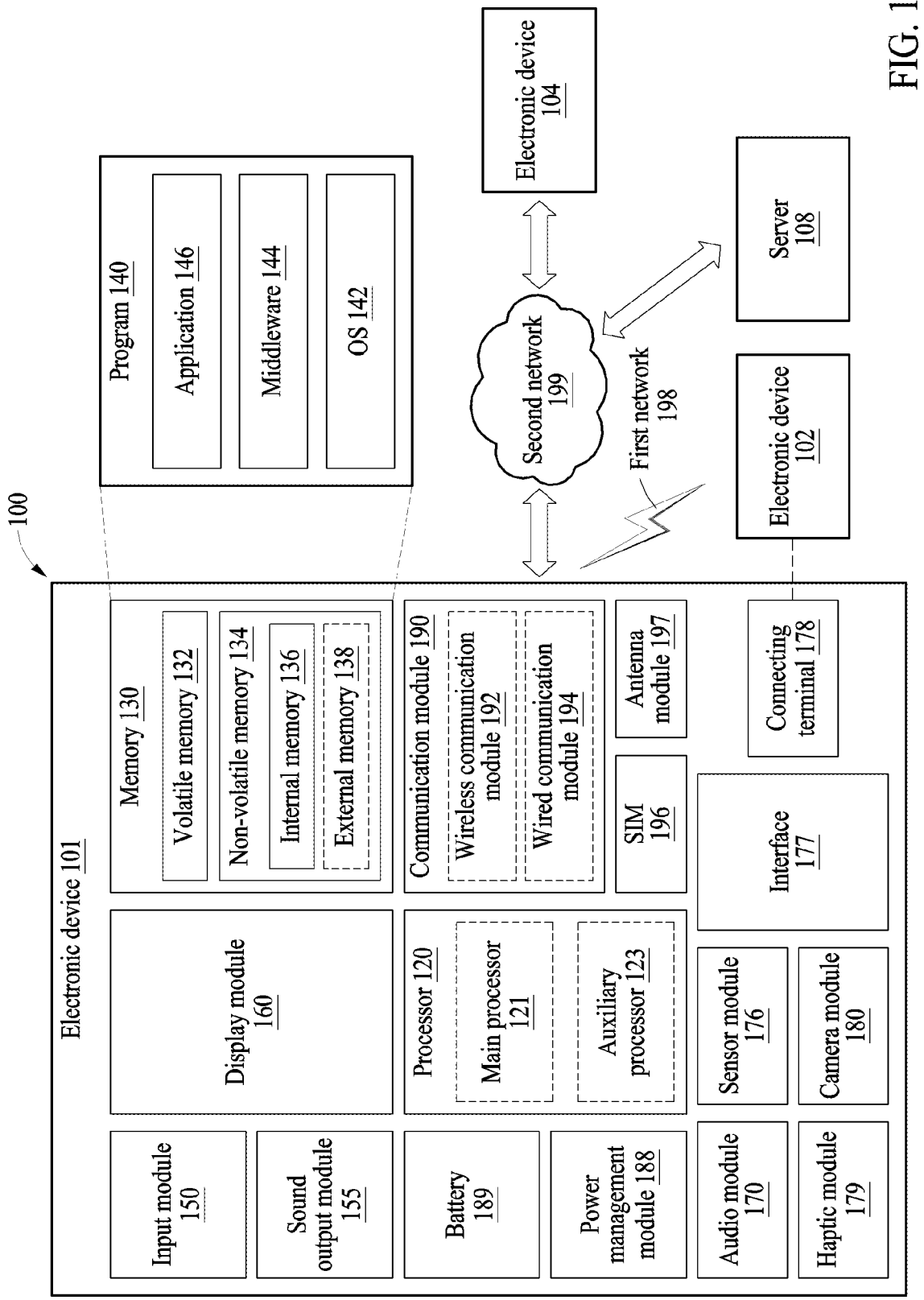
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker. The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to various example embodiments, an electronic device may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the foregoing examples.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer (or purchaser described herein). The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
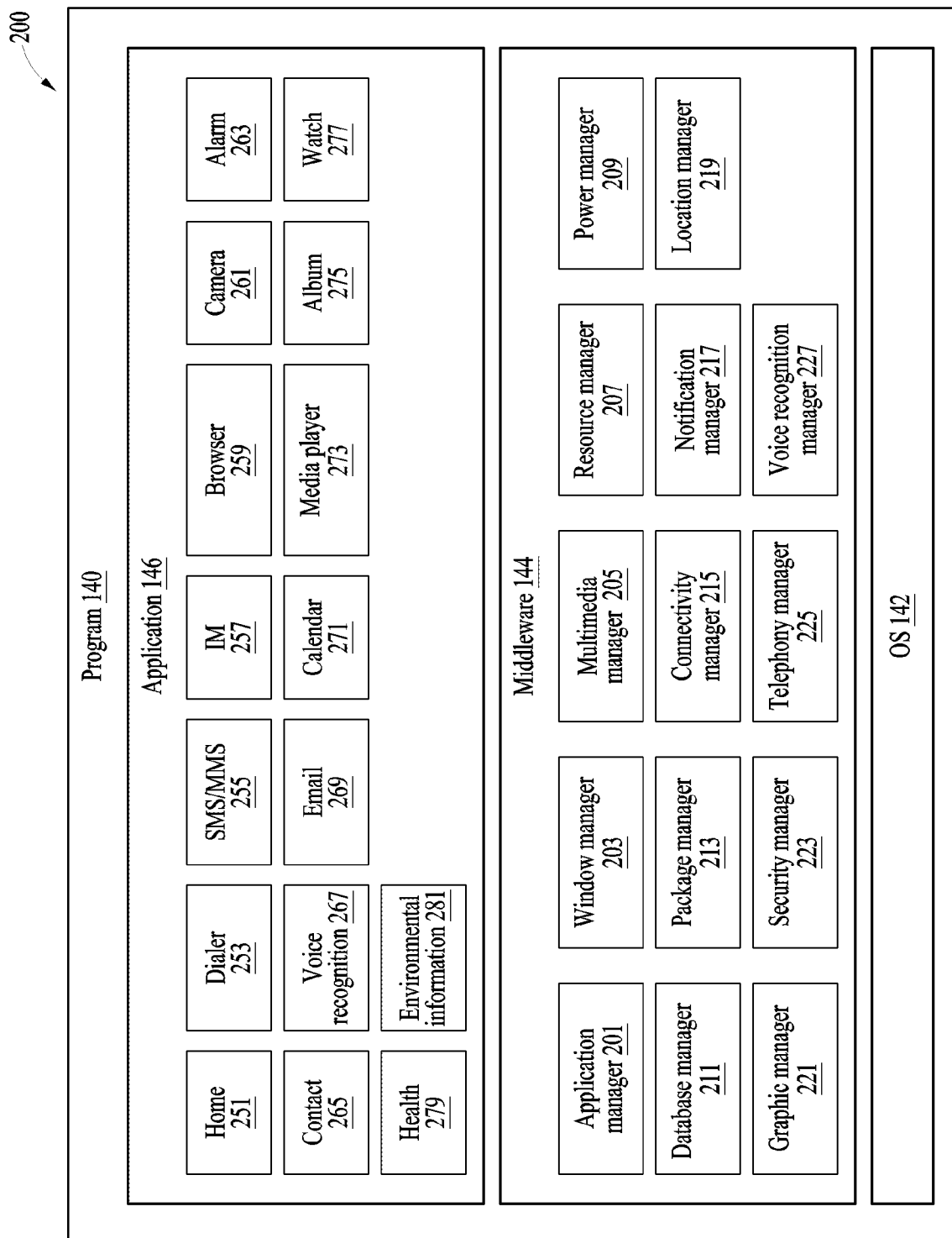
FIG. 2 is a block diagram illustrating an example configuration of a program according to various embodiments.

FIG. 2 is a block diagram illustrating an example configuration of a program according to various embodiments.

Referring to FIG. 2, a block diagram 200 illustrates a program 140 (e.g., the program 140 of FIG. 1). According to an example embodiment, the program 140 may include an operating system (OS) 142 (e.g., the OS 142 of FIG. 1) for controlling one or more resources of an electronic device (e.g., the electronic device 101 of FIG. 1), a middleware 144 (e.g., the middleware of FIG. 1), and/or an application 146 (e.g., the application 146 of FIG. 1) executable in the OS 142. The OS 142 may include, for example, Android™, iOS™ Windows™, Symbian™, Tizen™, or Bada™. At least some of the program 140 may be pre-loaded in the electronic device 101 during the manufacture, or downloaded or updated from an external electronic device (e.g., the electronic device 102 or 104, or the server 108 of FIG. 1) when it is used by a user.

The OS 142 may control management (e.g., allocation or recovery) of one or more system resources (e.g., process, memory, or power supply) of the electronic device 101. The OS 142 may include, alternatively or additionally, one or more driver programs for driving or operating another hardware device of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that the application 146 uses functions or information provided by the one or more resources of the electronic device 101. The middleware 144 may include, for example, an application manager 201, a window manger 203, a multimedia manager 205, a resource manager 207, a power manager 209, a database (DB) manager 211, a package manager 213, a connectivity manager 215, a notification manager 217, a location manger 219, a graphic manager 221, a security manager 223, a telephony manager 225, or a voice recognition manager 227.

The application manager 201 may manage, for example, a life cycle of the application 146. The window manager 203 may manage, for example, one or more graphical user interface (GUI) resources used for a screen. The multimedia manager 205 may, for example, identify one or more formats required for playing media files, and encode or decode a media file among the media files using a codec corresponding to a selected format. The resource manager 207 may manage, for example, a source code of the application 146 or a memory space of the memory 130. The power manager 209 may manage, for example, capacity, temperature, or power of the battery 189, and determine or provide information necessary for operations of the electronic device 101 using corresponding information. The power manager 209 may interwork with a basic input/output system (BIOS) (not shown) of the electronic device 101.

The DB manager 211 may generate, retrieve, or change a DB to be used by the application 146. The package manager 213 may manage, for example, installation or update of an application distributed in the form of a package file. The connectivity manager 215 may mange, for example, a wireless or direct connection between the electronic device 101 and an external electronic device. The notification manager 217 may provide a function for notifying a user of an occurrence of a preset event (e.g., an incoming call, a message, or an alarm). The location manager 219 may manage, for example, location information of the electronic device 101. The graphic manager 221 may manage, for example, one or more graphical effects and related user interfaces (UIs) to be provided to a user.

The security manager 223 may provide, for example, system security or user authentication. The telephony manager 225 may manage, for example, a voice call function or video call function provided by the electronic device 101. The voice recognition manager 227 may transmit voice data (or audio data) of a user to the server 108 and receive, from the server 108, a command corresponding to a function to be performed in the electronic device 101 based on at least a portion of the audio data or text data converted based on at least a portion of the audio data. The middleware 144 may dynamically delete some of existing components or add new components. At least a portion of the middleware 144 may be included as a part of the OS 142 or implemented as separate software different from the OS 142.

The application 146 may include, for example, home 251, dialer 253, short message service (SMS)/multimedia messaging service (MMS) 255, instant messaging (IM) 257, browser 259, camera 261, alarm 263, contacts 265, voice recognition 267, email 269, calendar 271, media player 273, album 275, watch 277, health 279 (e.g., measurements of bioinformation including, for example, an amount of physical motion or blood sugar), and/or environmental information 281 (e.g., measurements of an atmospheric pressure, a humidity, or a temperature) applications. The application 146 may further include an information exchange application (not shown) for supporting information exchange between the electronic device 101 and an external electronic device. The information exchange application may include, for example, a notification relay application set to transfer preset information (e.g., a call, a message, or an alarm) to an external electronic device, or a device management application set to manage an external electronic device. The notification relay application may transfer, to an external electronic device, notification information corresponding to a preset event (e.g., reception of a mail) occurring in another application (e.g., the email application 269) of the electronic device 101. Alternatively or additionally, the notification relay application may receive notification information from an external electronic device and provide the received notification information to a user of the electronic device 101.

The device management application may control a power supply (e.g., turning on/off) or functions (e.g., brightness, resolution, or focus) of an external electronic device communicating with the electronic device 101 or some components (e.g., a display module or a camera module) of the external electronic device. Alternatively or additionally, the device management application may support the installation, deletion, or updating of an application operating in an external electronic device.

Figure 3:
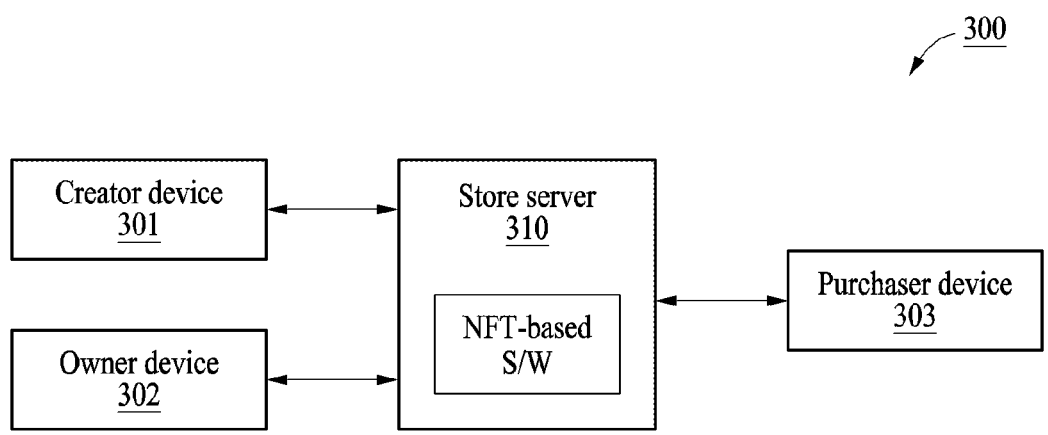
FIG. 3 is a block diagram illustrating an example configuration of a non-fungible token (NFT)-based software trading system according to various embodiments.

FIG. 3 is a block diagram illustrating an example configuration of a non-fungible token (NFT)-based software trading system according to various embodiments.

According to an example embodiment, an NFT-based software trading system 300 may verify ownership of software to which an NFT is issued (hereinafter simply referred to as an NFT-based software or NFT-based SW), and enable trading between consumers. The NFT-based software trading system 300 may issue the NFT corresponding to the software and enable anyone to verify an owner of the software through a blockchain or the like. The NFT-based software trading system 300 may issue the NFT corresponding to the software and may thereby enable anyone to find and check the software and copy the software. However, only a creator or purchaser of the software may claim the ownership of the software.

Referring to FIG. 3, the NFT-based software trading system 300 may include a store server 310, a creator device 301, an owner device 302, and a purchaser device 303. For example, the creator device 301, the owner device 302, and the purchaser device 303 may correspond to the electronic device 101 of FIG. 1, and the store server 310 may correspond to the electronic device 103 or 104 of FIG. 1 or the server 108 of FIG. 1.

The store server 310, may be a server that relays the generation and sale of NFT-based software, may issue an NFT corresponding to software and manage details of trading the NFT-based software in the form verifiable by anyone. For example, the issued NFT corresponding to the software may be implemented as a block that is stored in a blockchain network, and the details of trading the NFT-based software may be recorded in a transaction of the block. In the block implemented by the NFT, NFT metadata corresponding to the NFT-based network or identification information indicating the NFT metadata (e.g., a content identifier (CID)) may be stored as block data.

The creator device 310, which is a device of a user who generates NFT-based software, may generate NFT-based software by interworking with the store server 310 and publish the NFT-based software on the store server 310 to sell the NFT-based software therethrough. A creator of NFT-based software may be a user to whom ownership of the NFT-based software initially belongs. For example, the creator may be an initial owner of the NFT-based software. Hereinafter, an operation of generating NFT-based software by the creator device 301 through interwork with the store server 310 will be described in greater detail.

The purchaser device 303, which a device of a user who purchases NFT-based software published on the store server 310, may store and run the NFT-based software when the NFT-based software is purchased. A purchaser of NFT-based software may obtain ownership of the NFT-based software by purchasing the NFT-based software. Hereinafter, an operation of running NFT-based software by the purchaser device 303 will be described in greater detail.

The owner device 302, which is a device of a user to whom ownership of NFT-based software returns, may correspond to the creator device 301 before a trade of NFT-based software is completed, and to the purchaser device 303 after the trade of the NFT-based software is completed. The owner device 302 may sell the NFT-based software through the store server 310, and the ownership of the NFT-based software may be transferred to a purchaser through the sale and the ownership device 302 may thus be changed.

Figure 4:
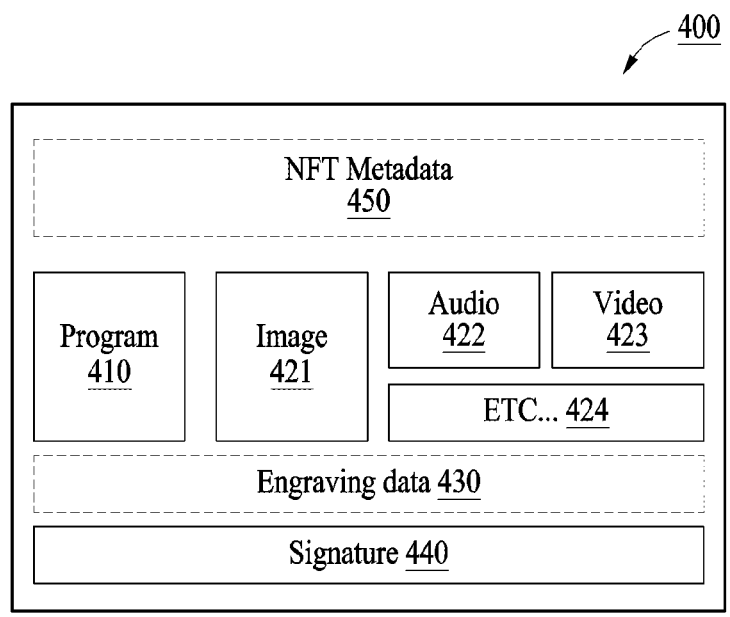
FIG. 4 is a block diagram illustrating an example configuration of NFT-based software according to various embodiments.

FIG. 4 is a block diagram illustrating an example configuration of NFT-based software according to various embodiments.

Referring to FIG. 4, NFT-based software 400 may include a program 410, contents (e.g., 421, 422, 423 and/or 424), engraving data 430, and a digital signature 440. According to an example embodiment, NFT-based software may be generated in a device (e.g., the creator device 301 of FIG. 3) linked with a server (e.g., the store server 310 of FIG. 3) for trading the NFT-based software. A detailed method of generating NFT-based software will be described hereinafter.

The contents may include playable multimedia contents, for example, an image 421, an audio 422, and a video 423. For example, the image 421 may include a plurality of images. The contents may also include other contents 424 of another format different from those of the image 421, the audio 422, and the video 423 illustrated in FIG. 4. The program 410 may include an instruction or execution code that is defined to output an operation in response to an input. For example, the program 410 may include an instruction defining how a content is output in response to an input, or an execution code for allowing software to be executed on a device. The digital signature 440 may be a signature for authenticating the genuineness of software and may include, for example, a signature of software-related information that is encrypted based on a private key of a creator of NFT-based software. The digital signature 440 may further include a signature of an owner, and for example, a signature of software-related information that is encrypted based on a private key of the owner.

The engraving data 430, which is data for a digital engraving service, may include, for example, an engraving content for displaying owner-related or software-related information and an instruction for displaying the engraving content. The engraving content may include, for example, a user-defined text and image, and a quick response (QR) code including owner-related and/or software-related information. The instruction for displaying the engraving content may include an instruction associated with a color, location, and time in and at which the engraving content is to be displayed, and with an action (e.g., automatic disappearance, movement, a color change, etc.) of how the engraving content is to be displayed, in addition to an instruction for simply outputting the engraving content.

According to an example embodiment, NFT metadata 450 corresponding to the NFT-based software 400 may be generated. The NFT metadata 450 may include identification information indicating the NFT-based software 400 and identification information indicating an owner of the NFT-based software 400. The NFT metadata 450 may be included in the NFT-based software 400, or may not be included in the NFT-based software 400 but be stored outside the NFT-based software 400 to be separately managed. When the NFT metadata 450 is not included in the NFT-based software 400, the NFT-based software 400 may further include information referring to the NFT metadata 450 corresponding to the NFT-based software 400. NFT metadata may be described herein as being included in NFT-based software.

The NFT metadata 450 may further include owner-related and/or NFT-based software-related information. For example, the NFT metadata 450 may further include information associated with a device to which an execution right for NFT-based software is assigned, identification information indicating a creator of the NFT-based software, information associated with a selling price of the NFT-based software, information associated with a generation time of the NFT-based software, and/or an edition number assigned to the NFT-based software. For example, the engraving data 430 may be included in the NFT metadata 450. That is, the engraving data 430 on the NFT-based software may be stored in the NFT metadata 450 that is managed separately from the NFT-based software 400.

As described above, NFT metadata or identification information (e.g., CID) indicating the NFT metadata may be implemented as a block to be stored in a blockchain network along with details of trading NFT-based software.

According to an example embodiment, the NFT metadata 450, the engraving data 430, and/or the digital signature 440 may be regenerated in response to an ownership transfer of NFT-based software. For example, the owner-related information in the NFT metadata 450 may be changed in response to the ownership transfer, and the NFT metadata 450 may be regenerated with the changed owner-related information reflected therein. An engraving content for displaying the owner-related information in the engraving data 430 may be changed based on the changed owner-related information, and the engraving data 430 may be regenerated with the changed owner-related information reflected therein. The digital signature 440 may be regenerated as a signature of a previous owner is replaced with a signature of an owner changed by the ownership transfer.

According to an example embodiment, the NFT metadata 450 and/or the engraving data 430 may include information that is not changed by the ownership transfer. For example, when NFT-based software is generated as a limited edition, the NFT metadata 450 may include an edition number of the NFT-based software. A limited number of NFTs may be issued for single software, and an edition number may correspond to the number that indicates an index of the NFTs that are issued in the limited number for specific software. For example, when 100 NFTs are issued for software, 100 NFT-based software corresponding to the software may be generated, and each NFT-based software may have an edition number that is one of 1 through 100. For example, the edition number may correspond to unchangeable information even by such an ownership transfer. When NFT-based software is generated as a limited edition, engraving data may be defined to display an edition number or display an edition number and the number of limited editions together, and an engraving content for displaying the edition number included in the engraving data may correspond to the unchangeable information even by the ownership transfer.

Figure 5:
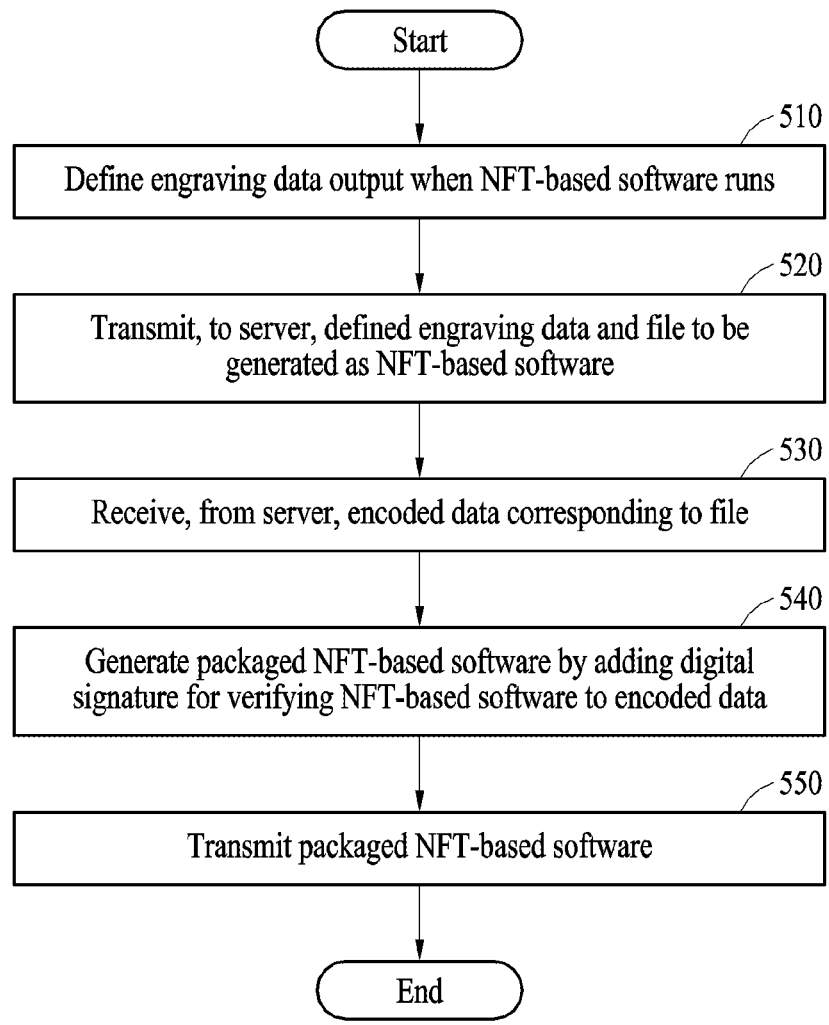
FIG. 5 is a flowchart illustrating an example method of generating NFT-based software according to various embodiments.

FIG. 5 is a flowchart illustrating an example method of generating NFT-based software according to various embodiments.

According to an example embodiment, a method of generating NFT-based software may be performed by a device (e.g., the electronic device 101 of FIG. 1 or the creator device 301 of FIG. 3) linked to a server (e.g., the server 108 of FIG. 1 or the store server 310 of FIG. 3) for trading NFT-based software. The server for trading NFT-based software may be simply referred to hereinafter as a "server."

Referring to FIG. 5, the method of generating NFT-based software may include operation 510 of defining engraving data (e.g., the engraving data 430 of FIG. 4) to be output when NFT-based software runs, operation 520 of transmitting, to the server, the defined engraving data and a file to be generated as the NFT-based software, operation 530 of receiving encoded data corresponding to the file from the server, operation 540 of generating packaged NFT-based software by adding, to the encoded data, a digital signature for verifying the NFT-based software, and operation 550 of transmitting the packaged NFT-based software to the server. Operation 520 may further include generating device-related information associated with a device to which an execution right for executing the NFT-based software is assigned and transmitting the generated device-related information to the server.

Operation 510 of defining the engraving data may include defining an engraving content and an instruction for displaying the engraving content. The engraving data may refer to information associated with an owner or software to be displayed when the software runs and may include the engraving content and the instruction for displaying the engraving content. For example, operation 510 may include determining the engraving content to be displayed at a specific execution step of the NFT-based software and determining a method of displaying the determined engraving content.

Operation 520 may include transmitting, to the server, the engraving data defined in operation 510 and the file to be generated as the NFT-based software. The file to be generated as the NFT-based software may correspond to a digital file corresponding to an execution code of a program (e.g., the program 410 of FIG. 4) and a content (e.g., the image 421, the audio 422, and/or the video 423 of FIG. 4) that are included in software to be generated as the NFT-based software.

Operation 520 may further include generating the device-related information associated with the device to which the execution right for the NFT-based software is assigned and transmitting the generated device-related information to the server. The server may generate NFT metadata combined with the device-related information associated with the device to which the execution right for the NFT-based software is assigned. For example, the NFT metadata corresponding to the NFT-based software may include the device-related information associated with the device to which the execution right for the NFT-based software is assigned. The device-related information may be used to limit a device that may run the NFT-based software, and the NFT-based software may be set to run in the device to which the execution right is assigned. An operation of a device running NFT-based software based on an execution right will be described in greater detail below.

The server may generate the NFT metadata (e.g., the NFT metadata 450 of FIG. 4) corresponding to the NFT-based software based on the file received in operation 520. As described above, the NFT metadata may include NFT-based software-related and/or owner-related information, such as, identification information indicating the NFT-based software and identification information indicating an owner of the NFT-based software.

The encoded data received in operation 530 may include the file to be generated as the NFT-based software that is combined with the NFT metadata generated in the server and the engraving data. The encoded data may include information for referring to the combined NFT metadata and information for executing the combined engraving data. For example, the information for referring to the combined NFT metadata may include information indicating the NFT metadata, such as, identification information of the NFT metadata generated corresponding to the NFT-based software and a stored address. For example, the information for executing the combined engraving data may include information encoded to allow the engraving data defined in operation 510 to be performed as the NFT-based software runs. When the engraving data is stored in NFT metadata that is managed separately from the NFT-based software, the information for executing the combined engraving data may include information for calling the engraving data stored in the NFT metadata.

Operation 540 may include packaging the NFT-based software by adding a digital signature to the encoded data received from the server. As described above, the digital signature may refer to a signature for authenticating the genuineness of software and may include, for example, a signature of information associated with software encrypted based on a private key of a creator of the NFT-based software.

The NFT-based software packaged in operation 540 may be transmitted to the server, and the server may publish the received NFT-based software on a store platform for trading the NFT-based software. A user using the store platform of the server may purchase the NFT-based software published on the platform through a device (e.g., the purchaser device 303 of FIG. 3), and the device of such a purchaser may store and run the NFT-based software. As described above, at an ownership transfer by the purchase of the NFT-based software, the NFT metadata, the engraving data, and/or the digital signature corresponding to the NFT-based software may be regenerated based on the ownership transfer. The server may manage information associated with the ownership transfer by the purchase, through a medium that may not be forged or altered, such as, for example, a blockchain.

According to an example embodiment, a device for generating NFT-based software may include a communication module (e.g., the communication module 190 of FIG. 1) that may communicate with a server, and a processor (e.g., the processor 120 of FIG. 1) that may perform one or more operations of the method of generating NFT-based software. The communication module may perform an operation of transmitting and receiving data to and from the server, and the processor may perform an operation of generating NFT-based software to be described hereinafter.

According to an example embodiment, a device may include a communication module that may include various communication circuitry and communicate with a server for trading NFT-based software, and at least one processor that may define engraving data to be output when the NFT-based software runs, transmit the defined engraving data and a file to be generated as the NFT-based software to the server, receive encoded data corresponding to the file generated based on the engraving data and the NFT metadata corresponding to the NFT-based software from the server, generate packaged NFT-based software by adding a digital signature for verifying the NFT-based software to the encoded data, and transmit the packaged NFT-based software to the server.

Figure 6:
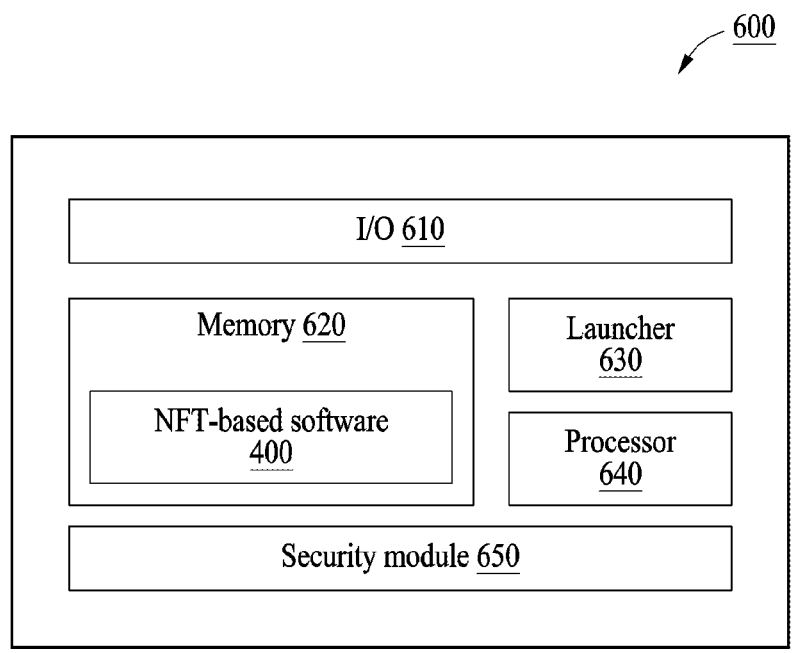
FIG. 6 is a block diagram illustrating an example configuration of a device that runs NFT-based software according to various embodiments.

FIG. 6 is a block diagram illustrating an example configuration of a device that runs NFT-based software according to various embodiments.

Referring to FIG. 6, a device 600 (e.g., the electronic device 101 of FIG. 1, the owner device 302 of FIG. 3, or the purchaser device 303 of FIG. 3) for running NFT-based software may include an input/output (I/O) interface (e.g., including input/output circuitry) 610 (e.g., the input module 150, the sound output module 155, or the display module 160 of FIG. 1), a memory 620 (e.g., the memory 130 of FIG. 1), a launcher 630 (e.g., the program 140 of FIG. 1), a processor (e.g., including processing circuitry) 640 (e.g., the processor 120 of FIG. 1), and a security module 650 (e.g., the program 140 of FIG. 1 or the security manager 223 of FIG. 2).

The I/O interface 610 may be an interface for receiving an input from a user and outputting data and may include, for example, an I/O device, such as, for example, a touch screen in which a touch sensor is embedded and that receives a touch input and visually outputs data generated in a device and a speaker that acoustically outputs the data generated in the device. The user may input an execution request for executing NFT-based software (e.g., the NFT-based software 400 of FIG. 4) through the I/O interface 610.

The memory 620 may store, in the device 600, the NFT-based software 400 downloaded by being purchased from a server. In addition to this, the memory 620 may store data associated with the running of the NFT-based software 400, such as, for example, data for running the NFT-based software 400 and data generated while the NFT-based software 400 is running.

The launcher 630 and the processor 640 may perform an operation of running the NFT-based software 400 stored in the memory 620, and for example, may execute a code of a program included in the NFT-based software 400. The launcher 630 may refer to a program that runs a homescreen of the device 600 and include, for example, a program for running a theme installed in the device 600. For example, when NFT-based software is a theme about the homescreen of the device 600, the NFT-based software may run through the launcher 630.

The launcher 630 or the processor 640 may run the NFT-based software based on the code of the program included in the NFT-based software, and load and output predefined engraving data corresponding to the NFT-based software. As described above, the engraving data may include an engraving content for displaying at least one of owner-related information and/or NFT-based software-related information, and an instruction for displaying the engraving content. As the NFT-based software runs, the engraving data corresponding to the NFT-based software may be loaded, and the engraving content may be output on an execution screen of the NFT-based software through the I/O interface 610 based on the instruction for displaying the engraving content.

For example, the instruction for the displaying defined in the engraving data may include an engraving content to be displayed in response to each event that may occur as the NFT-based software runs and a method of displaying the engraving content. In this example, the launcher 630 or the processor 640 may output an engraving content corresponding to an event occurring as the NFT-based software runs in a specific form at a specific location of an execution screen based on a defined displaying method, based on the instruction for displaying defined in the engraving data.

The security module 650, which is a module for verifying an execution right of the device 600 for executing the NFT-based software 400, may, for example, provide authentication information of the device 600 or authentication information of a user of the device 600 based on device-related information associated with a device to which the execution right is assigned that is included in NFT metadata corresponding to the NFT-based software 400. For example, when the NFT metadata includes the device-related information associated with the device to which the execution right is assigned, the security module 650 may compare the device-related information and identification information of the device 600 and determine whether the device 600 corresponds to the device to which the execution right is assigned. Alternatively, when the NFT metadata includes user account information associated with a user account to which the execution right is assigned, the security module 650 may compare the user account information and user account information of a user account using the device 600 and determine whether the user account using the device 600 corresponds to the account to which the execution right is assigned.

For example, when the execution right of the device 600 or the user account using the device 600 for NFT-based software is verified as a result of determining the execution right, an instruction for running the NFT-based software may be transferred to the processor 640 or the launcher 630. When the execution right for the NFT-based software is not verified as the result of determining the execution right, an instruction for suspending the running of the NFT-based software may be transferred to the processor 640 or the launcher 630. That is, when the execution right of the device 600 for NFT-based software is verified by the security module 650, the NFT-based software may be run on the device 600. However, when the execution right of the device 600 for the NFT-based software is not verified by the security module 650, the running of the NFT-based software may be suspended in the device 600.

According to an example embodiment, the device 600 may include the memory 620 configured to store therein NFT-based software 400, and the at least one processor 640 configured to run the NFT-based software in response to an execution request for executing the NFT-based software, load NFT metadata including identification information indicating the NFT-based software, identification information indicating an owner of the NFT-based software, and predefined engraving data in response to the execution request, and output the engraving data included in the NFT metadata based on an event occurring as the NFT-based software runs.

According to an example embodiment, the device 600 may include the memory 620 configured to store therein NFT-based software 400, and the at least one processor 640 configured to receive an execution request for executing the NFT-based software, load NFT metadata corresponding to the NFT-based software in response to the execution request, verify a right for execution of the NFT-based software based on at least one of device-related information or owner-related information that is included in the NFT metadata, run the NFT-based software based on a result of the verifying, and output engraving data corresponding to the NFT-based software on an execution screen displayed as the NFT-based software runs.

When outputting the engraving data, the processor 640 may load the predefined engraving data corresponding to the NFT-based software, and output an engraving content included in the engraving data based on an instruction for displaying defined in the engraving data.

When outputting the engraving content, the processor 640 may output an engraving content corresponding to an event occurring as the NFT-based software runs based on the instruction for displaying defined in the engraving data.

When verifying the right for the execution of the NFT-based software, the processor 640 may compare the device-related information included in the NFT metadata and identification information of the device 600 and verify the right of the device 600 for the execution of the NFT-based software.

Figure 7:
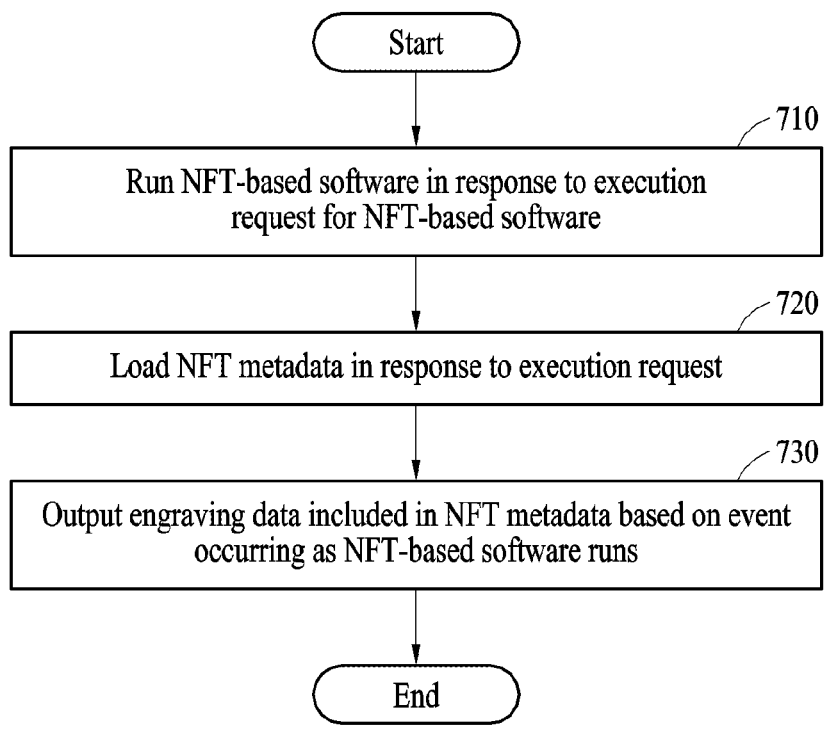
FIG. 7 is a flowchart illustrating an example method of running NFT-based software to be performed in a device according to various embodiments.

FIG. 7 is a flowchart illustrating an example method of running NFT-based software to be performed in a device according to various embodiments.

Referring to FIG. 7, a method of running NFT-based software (e.g., the NFT-based software 400 of FIG. 4 or the NFT-based software 400 of FIG. 6) to be performed in a device (e.g., the electronic device 101 of FIG. 1, the owner device 302 of FIG. 3, the purchaser device 303 of FIG. 3, or the device 600 of FIG. 6) may include operation 710 of running the NFT-based software in response to an execution request for executing the NFT-based software, operation 720 of loading NFT metadata including identification information indicating the NFT-based software, identification information indicating an owner of the NFT-based software, and predefined (e.g., specified) engraving data, in response to the execution request, and operation 730 of outputting the engraving data included in the NFT metadata based on an event occurring as the NFT-based software runs.

As described above, the NFT-based software may include at least one content and at least one execution code, and the engraving data may include an engraving content for displaying at least one of owner-related information or NFT-based software-related information, and an instruction for displaying the engraving content.

Operation 730 of outputting the engraving data may include loading the predefined engraving data in the NFT metadata, and outputting the engraving content included in the engraving content corresponding to an event occurring as the NFT-based software runs based on the instruction for the displaying defined in the engraving data.

The NFT metadata may further include at least one of an edition number assigned to the NFT-based software, identification information indicating a creator of the NFT-based software, or device-related information associated with a device to which an execution right for executing the NFT-based software is assigned.

Figure 8:
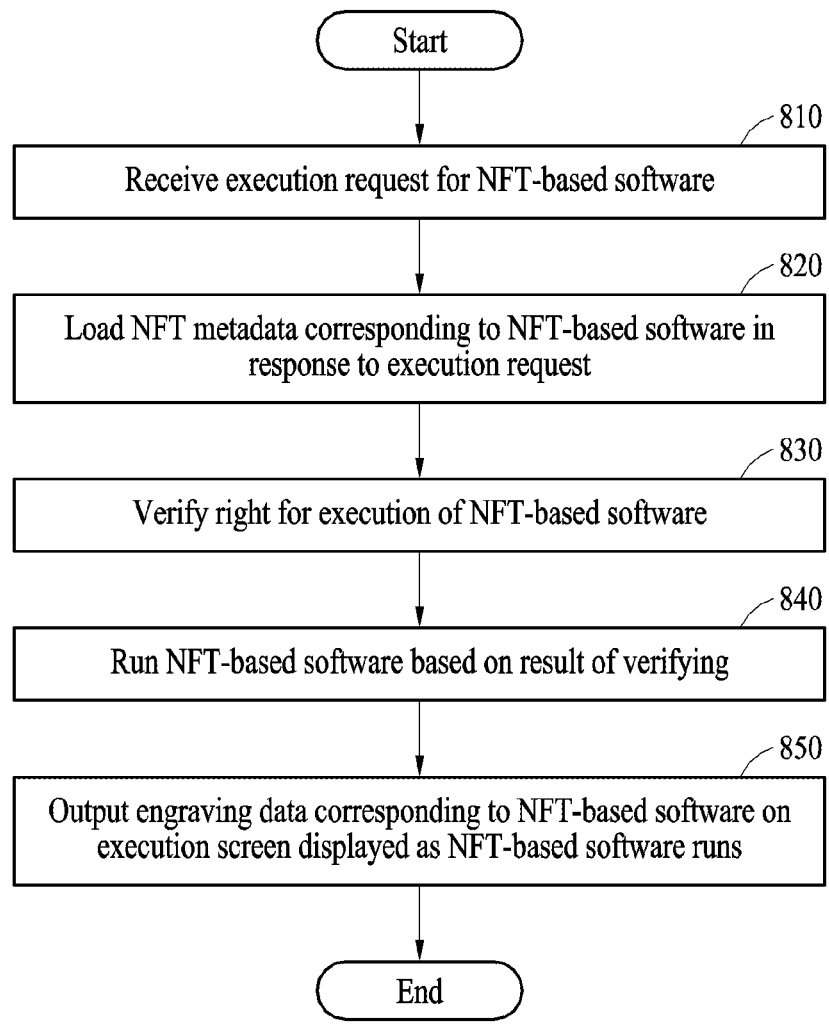
FIG. 8 is a flowchart illustrating an example method of running NFT-based software to be performed in a device according to various embodiments.

FIG. 8 is a flowchart illustrating an example method of running NFT-based software to be performed in a device according to various embodiments.

Referring to FIG. 8, a method of running NFT-based software (e.g., the NFT-based software 400 of FIG. 4 or the NFT-based software 400 of FIG. 6) to be performed in a device (e.g., the electronic device 101 of FIG. 1, the owner device 302 of FIG. 3, the purchaser device 303 of FIG. 3, or the device 600 of FIG. 6) may include operation 810 of receiving an execution request for executing the NFT-based software, operation 820 of loading NFT metadata corresponding to the NFT-based software in response to the execution request, operation 830 of verifying a right for execution of the NFT-based software based on at least one of device-related information or owner-related information that is included in the NFT metadata, operation 840 of running the NFT-based software based on a result of the verifying, and operation 850 of outputting engraving data corresponding to the NFT-based software on an execution screen displayed as the NFT-based software runs.

As described above, the NFT-based software may include at least one content and at least one execution code, and the engraving data may include an engraving content for displaying at least one of owner-related information or NFT-based software-related information and an instruction for displaying the engraving content.

The NFT metadata may further include identification information indicating the NFT-based software and identification information indicating an owner of the NFT-based software.

For example, operation 830 may include verifying the right for the execution of the NFT-based software of the device based on a comparison between the device-related information included in the NFT metadata and identification information of the device.

For example, in operation 830, the verifying of the right may include verifying the right for the execution of the NFT-based software of the device based on a comparison between the owner-related information included in the NFT metadata and user information stored in the device.

Operation 850 of outputting the engraving data may include loading the predefined (e.g., specified) engraving data corresponding to the NFT-based software and outputting the engraving content included in the engraving data based on the instruction for the displaying defined in the engraving data.

For example, the outputting of the engraving content may include outputting an engraving content corresponding to an event occurring as the NFT-based software runs, based on the instruction for the displaying defined in the engraving data.

Figure 9:
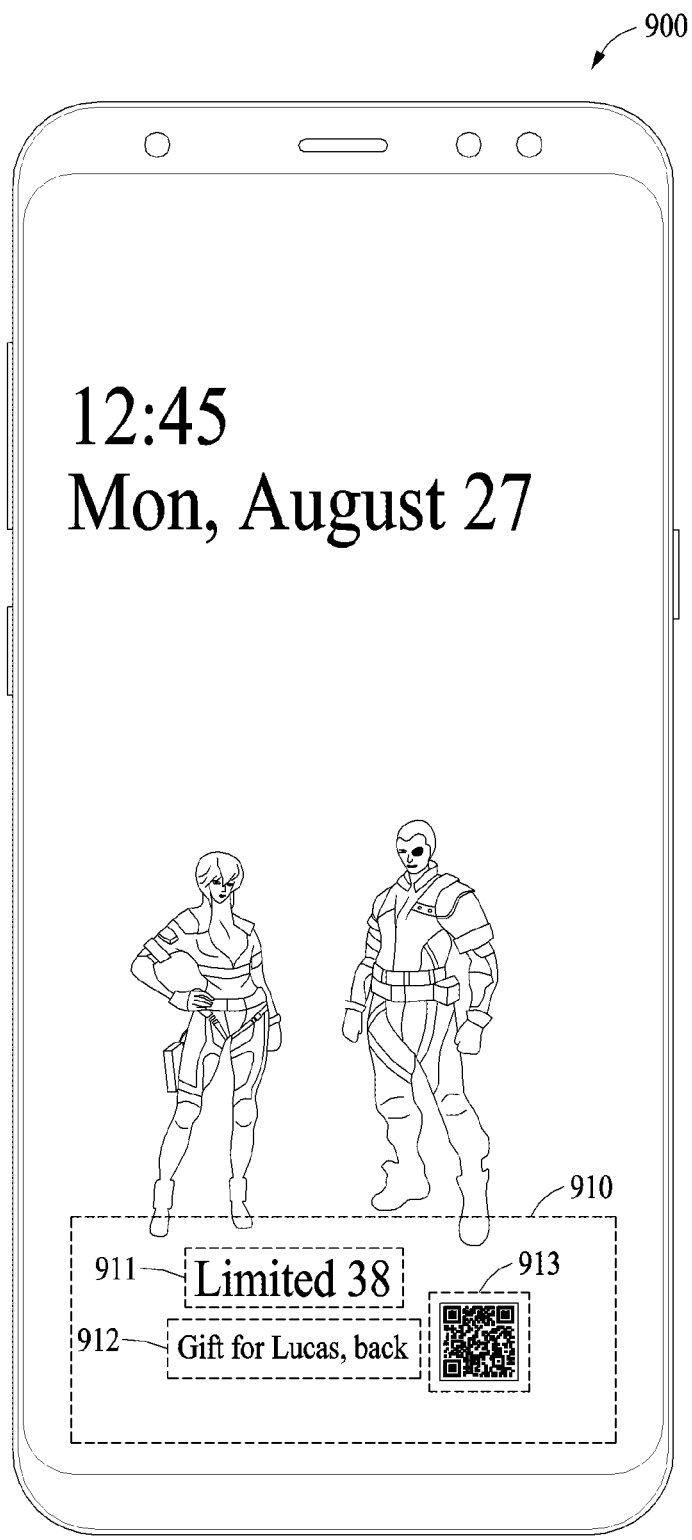
FIG. 9 is a diagram illustrating an example screen of a device on which NFT-based software runs according to various embodiments.

FIG. 9 is a diagram illustrating an example screen of a device on which NFT-based software runs according to various embodiments.

Referring to FIG. 9, NFT-based software (e.g., the NFT-based software 400 of FIG. 4 or the NFT-based software 400 of FIG. 6) may include a theme that configures a homescreen or an application screen of a device (e.g., the electronic device 101 of FIG. 1, the owner device 302 of FIG. 3, the purchaser device 303 of FIG. 3, or the device 600 of FIG. 6). For example, the theme may be run through a launcher (e.g., the program 140 of FIG. 1 or the launcher 630 of FIG. 6) of the device or a processor (e.g., the processor 120 of FIG. 1 or the processor 640 of FIG. 6) of the device.

For example, on an execution screen 900 displayed as NFT-based software runs in the device, engraving data 910 corresponding to the NFT-based software may be output. The engraving data 910 output through the execution screen 900 of the NFT-based software may include a text 912 indicating owner-related information and a QR code 913 indicating information associated with the NFT-based software and/or ownership. For example, when the NFT-based software is provided as a limited edition, an edition number 911 assigned to the NFT-based software may be included as an engraving content. For example, the text 912 indicating the owner-related information may include a text indicating identification information of an owner and a customized text defined by the owner. For example, at scanning of the QR code 913, the information associated with the NFT-based software and/or ownership may be output. For example, the edition number 911 may include a unique number assigned to the NFT-based software and may be displayed along with the number of limited editions. However, engraving data is not limited to the example illustrated in FIG. 9, and various sets of data included in the engraving data may be output in various forms through an execution screen of NFT-based software. An engraving content may be output on a screen in a defined displaying method based on an instruction defined in the engraving data.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of executing non-fungible token (NFT)-based software that includes at least one theme performed on a device comprising computing circuitry, the method comprising:
   receiving an execution request for executing the NFT-based software on the device;
   loading NFT metadata including engraving data corresponding to the NFT-based software in response to the execution request, wherein the NFT metadata is different from and is added to the NFT-based software that includes the at least one theme, and wherein the engraving data indicates at least one of owner-related information or NFT-based software-related information of the NFT-based software;
   verifying a right for execution of the NFT-based software based on owner-related information included in the NFT metadata;
   executing the NFT-based software based on a result of the verifying; and
   displaying in accordance with an instruction defined in the engraving data, the engraving data corresponding to the NFT-based software and the theme on an execution screen displayed as the NFT-based software executes.

2. The method of claim 1, wherein the displaying of the engraving data comprises:
   displaying an engraving content included in the engraving data based on the instruction defined in the engraving data.

3. The method of claim 2, wherein the displaying of the engraving content comprises:
   displaying engraving content corresponding to an event occurring as the NFT-based software executes based on the instruction defined in the engraving data.

4. The method of claim 1, wherein the verifying of the right for the execution of the NFT-based software of the device is based on comparing device-related information and identification information of the device included in the NFT metadata.

5. The method of claim 1, wherein the verifying of the right for the execution of the NFT-based software of the device is based on comparing owner-related information included in the NFT metadata and user information stored in the device.

6. The method of claim 1, wherein the NFT-based software comprises at least one content and at least one execution code.

7. The method of claim 1, wherein the NFT metadata further comprises:
   identification information indicating the NFT-based software; and
   identification information indicating an owner of the NFT-based software.

8. The method of claim 1, wherein the engraving data comprises:
   an engraving content indicating at least one of owner-related information or NFT-based software-related information of the NFT-based software; and
   the instruction for displaying the engraving content.

9. A method of executing non-fungible token (NFT)-based software that includes at least one theme performed on a device that includes processing circuitry, the method comprising:
   executing the NFT-based software in response to an execution request for executing the NFT-based software;
   loading NFT metadata comprising identification information indicating the NFT-based software, identification information indicating an owner of the NFT-based software, and specified engraving data, in response to the execution request, wherein the NFT metadata is different from and is added to the NFT-based software that includes the at least one theme; and
   displaying in accordance with an instruction defined in the engraving data, the engraving data included in the NFT metadata and the theme based on an event occurring as the NFT-based software executes.

10. The method of claim 9, wherein the displaying of the engraving data comprises:
    loading the specified engraving data in the NFT metadata; and
    outputting an engraving content included in the engraving data corresponding to the event occurring as the NFT-based software executes based on the instruction defined in the engraving data.

11. The method of claim 9, wherein the NFT metadata further comprises at least one of:
    an edition number assigned to the NFT-based software;
    identification information indicating a creator of the NFT-based software; or
    information associated with a device to which an execution right for executing the NFT-based software is assigned.

12. A non-transitory computer-readable storage medium storing instructions that, when executed by a processor, cause the processor to perform the operations of claim 1.

13. A device comprising:
    a memory configured to store non-fungible token (NFT)-based software; and
    at least one processor including processing circuitry configured to:
    receive an execution request for executing the NFT-based software;
    load NFT metadata including engraving data corresponding to the NFT-based software in response to the execution request, wherein the NFT metadata is different from and is added to the NFT-based software that includes the at least one theme, and wherein the engraving data indicates at least one of owner-related information or NFT-based software-related information of the NFT-based software;
    verify a right for execution of the NFT-based software based on owner-related information included in the NFT metadata;
    execute the NFT-based software based on a result of the verifying; and
    display, in accordance with an instruction defined in the engraving data, the engraving data corresponding to the NFT-based software and the theme on an execution screen displayed as the NFT-based software executes.

14. The device of claim 13, wherein the at least one processor is configured to:
    display an engraving content included in the engraving data based on the instruction for displaying defined in the engraving data.

15. The device of claim 14, wherein the at least one processor is configured to:
    display an engraving content corresponding to an event occurring as the NFT-based software executes based on the instruction for displaying defined in the engraving data.

16. The device of claim 13, wherein, for the verifying of the right, the at least one processor is configured to:
    verify the right for the execution of the NFT-based software of the device based on comparing device-related information included in the NFT metadata and identification information of the device.

17. A device comprising:
    a memory configured to store non-fungible token (NFT)-based software that includes at least one theme; and
    at least one processor including processing circuitry configured to:
    execute the NFT-based software in response to an execution request for executing the NFT-based software;
    load NFT metadata comprising identification information indicating the NFT-based software, identification information indicating an owner of the NFT-based software, and specified engraving data, in response to the execution request, wherein the NFT metadata is different from and is added to the NFT-based software that includes the at least one theme; and
    display, in accordance with an instruction defined in the engraving data, the engraving data included in the NFT metadata and the theme based on an event occurring as the NFT-based software executes.

\* \* \* \* \*